US006021051A

United States Patent [19]

Laskai et al.

[11] Patent Number: 6,021,051

[45] Date of Patent: Feb. 1, 2000

[54] POWER CONVERTER WITH CROWBAR CIRCUIT AND CONTROL FOR VERY FAST OUTPUT VOLTAGE TURN-OFF

[75] Inventors: Laszlo Laskai; Milan Zarko Ilic, both of Clifton Park, N.Y.

[73] Assignee: General Electric Company, Schenectady, N.Y.

[21] Appl. No.: 09/222,354

[22] Filed: Dec. 29, 1998

[51] Int. Cl.[7] .................................................. H02M 3/335

[52] U.S. Cl. ................................ 363/20; 363/21; 363/58

[58] Field of Search ................................ 363/17, 20, 21, 363/40, 58, 131, 132

[56] References Cited

U.S. PATENT DOCUMENTS

| | | | |
|---|---|---|---|
| 3,986,097 | 10/1976 | Woods | 363/22 |
| 4,104,714 | 8/1978 | Smith et al. | 363/21 |
| 5,099,406 | 3/1992 | Harada et al. | 363/20 |
| 5,701,238 | 12/1997 | Weidinger et al. | 363/21 |
| 5,734,563 | 3/1998 | Shinada | 363/21 |
| 5,828,558 | 10/1999 | Korcharz et al. | 363/20 |
| 5,886,880 | 3/1999 | Hisanaga | 363/20 |

OTHER PUBLICATIONS

"Push–Pull Power Converter with Crowbar Circuit for Very Fast Output Voltage Turn–Off," Laszlo Laskai, Milan Z. Ilic, Serial No. 09/222,353 (GE docket RD–26312), filed Dec. 29, 1998.

*Primary Examiner*—Adolf Denske Berhane
*Attorney, Agent, or Firm*—Jill M. Breedlove; Douglas E. Stoner

[57] ABSTRACT

A forward converter, having a single switching device, is coupled through an isolation transformer to a crowbar circuit and an output capacitor for controlling the isolated output voltage turn-off. The crowbar circuit, including a trigger device and a resistor, is coupled between the transformer and the output capacitor. The conduction times of the converter switching device are controlled to regulate the energy stored in the transformer and to generate a reverse voltage having a predetermined amplitude. During the output voltage-on mode, the amplitude of the reverse voltage swing is controlled to be sufficiently low such that the converter operates as a conventional forward converter. For output voltage turn-off, the conduction time of the switching device is controlled to obtain a voltage swing of sufficient magnitude to trigger the crowbar circuit, and thus rapidly discharge the output capacitor.

8 Claims, 5 Drawing Sheets

POWER CONVERTER WITH CROWBAR CIRCUIT AND CONTROL FOR VERY FAST OUTPUT VOLTAGE TURN-OFF

BACKGROUND OF THE INVENTION

The present invention relates generally to power supplies utilizing transformer isolation and requiring very fast isolated voltage turn-off, such as may be useful in electron tube applications, such as x-ray tubes or electron beam guns, for example.

As an exemplary application, gridding circuits for controlling x-ray tubes reduce radiation exposure associated with decaying x-ray tube current. For fast x-ray beam turn-on and turn-off, the gridding voltage must be applied and removed rapidly. In typical gridding circuit arrangements, the grid voltage turn-off (i.e., x-ray beam turn-on) is accomplished by discharging an output capacitor through a bleeder resistor. Due to the time needed to discharge the output capacitor, as well as a practical limitation of the power loss allowable in the bleeder resistor, the output capacitance value is limited. As the output capacitance is limited, a high-gain path is formed between the output capacitance and the parasitic capacitance of the grid with respect to ground for the ac ripple from the high voltage generator. The modulation caused by the ac ripple across the grid and cathode during x-ray exposure tends to shorten filament life, and hence tube life, and also tends to degrade image quality, typically resulting in reliability problems.

Low output impedance gridding circuits are available but are limited in dynamics, e.g., by the time required to reset or discharge the parasitic impedances introduced by the isolation transformer magnetizing inductance and winding capacitance. Other low impedance gridding circuit arrangements disadvantageously require that the power control and gating arrangement be supplied from the filament drive.

Accordingly, it is desirable to provide a simple gridding circuit with a relatively low output impedance which does not restrict grid dynamics, e.g., in terms of time and speed. It is furthermore desirable to provide a gridding circuit which overcomes reliability issues associated with existing gridding circuit arrangements.

BRIEF SUMMARY OF THE INVENTION

A forward converter, comprising a single switching device, is coupled through an isolation transformer to a crowbar circuit and an output capacitor for controlling the isolated output voltage turn-off. The crowbar circuit, comprising a trigger device, is coupled between the transformer and the output capacitor. The conduction times of the converter switching device, or the volt-seconds applied to the transformer primary winding, are controlled to regulate the energy stored in the transformer and to generate a reverse voltage having a predetermined amplitude. During the output voltage-on mode, the amplitude of the reverse voltage swing is controlled to be sufficiently low such that the converter operates as a conventional forward converter. For output voltage turn-off, the conduction time of the switching device is controlled to obtain a voltage swing of sufficient magnitude to trigger the crowbar circuit, and thus rapidly discharge the output capacitor.

DETAILED DESCRIPTION OF THE INVENTION

A converter with crowbar circuitry in accordance with preferred embodiments of the present invention is applicable generally to power supplies utilizing transformer isolation and requiring fast output voltage turn-off. Exemplary applications include electron tube applications, such as x-ray tubes and electron beam guns. By way of example only, however, the description herein is provided with particular reference to x-ray tube gridding circuits.

Figure 1:
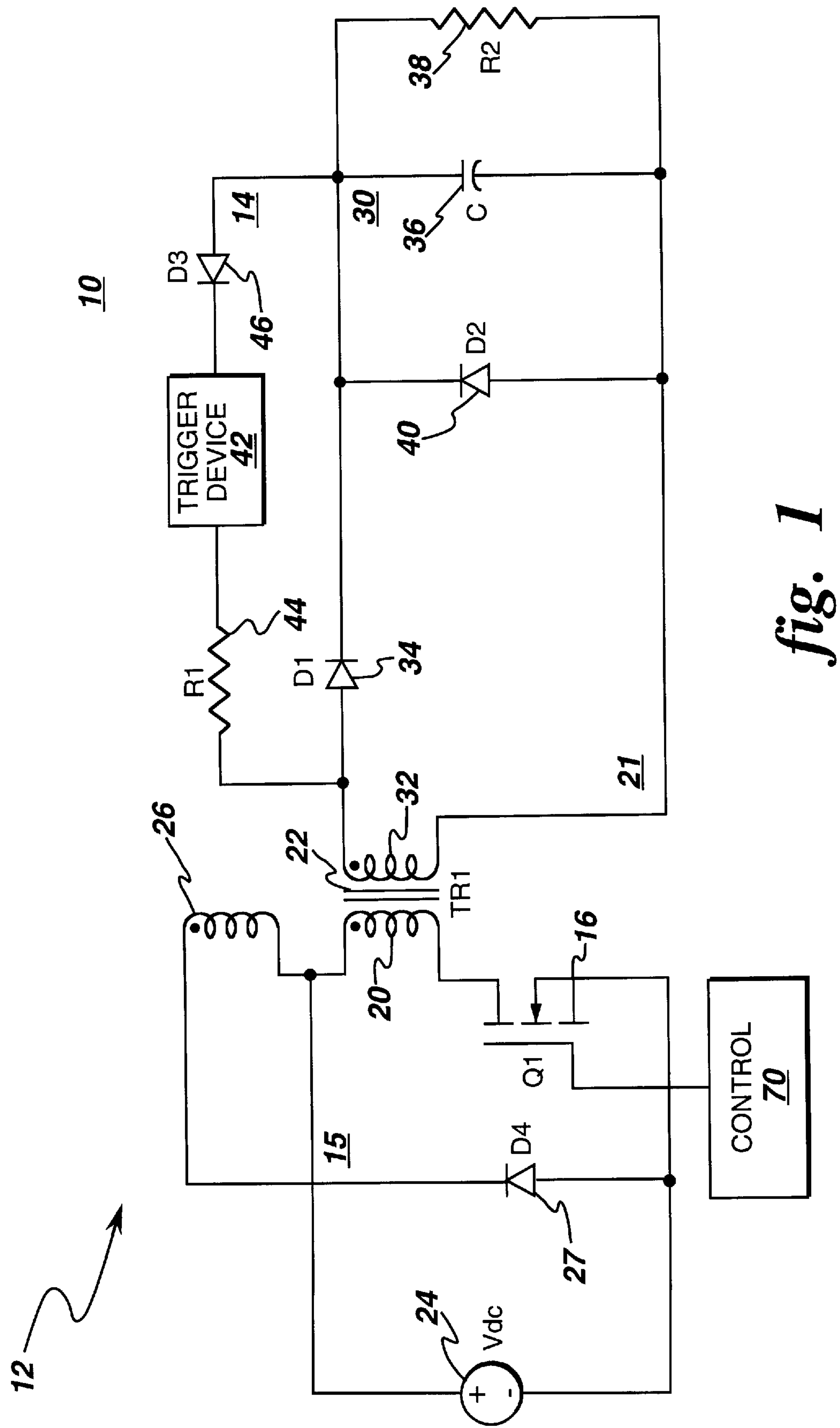
FIG. 1 schematically illustrates a power converter, including a crowbar circuit, in accordance with preferred embodiments of the present invention.

FIG. 1 illustrates a circuit 10 comprising a converter 12 and a crowbar circuit 14. (Crowbar is a term generally known in the art to mean a controlled short-circuit.) Converter 12 comprises an input stage 15 with a single switching device 16 (Q1). Switching device 16 is coupled in series with a primary winding 20 of an isolation transformer 22 (TR1), the series combination of device 16 and winding 20 being connected in parallel across an input voltage supply 24 (Vdc). A secondary (or reset) winding 26 of transformer 22 is connected to ground via a diode 27 (D4), the series combination of reset winding 26 and diode 27 also being connected in parallel across supply 24. An output stage 30 of forward converter 12 comprises a secondary winding 32 of transformer 22, one terminal of which is connected to the anode of a rectifying diode 34 (D1). The cathode of diode 34 is connected to an output capacitor 36 (C) which is illustrated as being connected in parallel with a resistor 38 (R2). Another diode 40 (D2) is connected in parallel with output capacitor 36 such that the cathode of diode 40 is connected to the cathode of diode 34.

Figure 2:
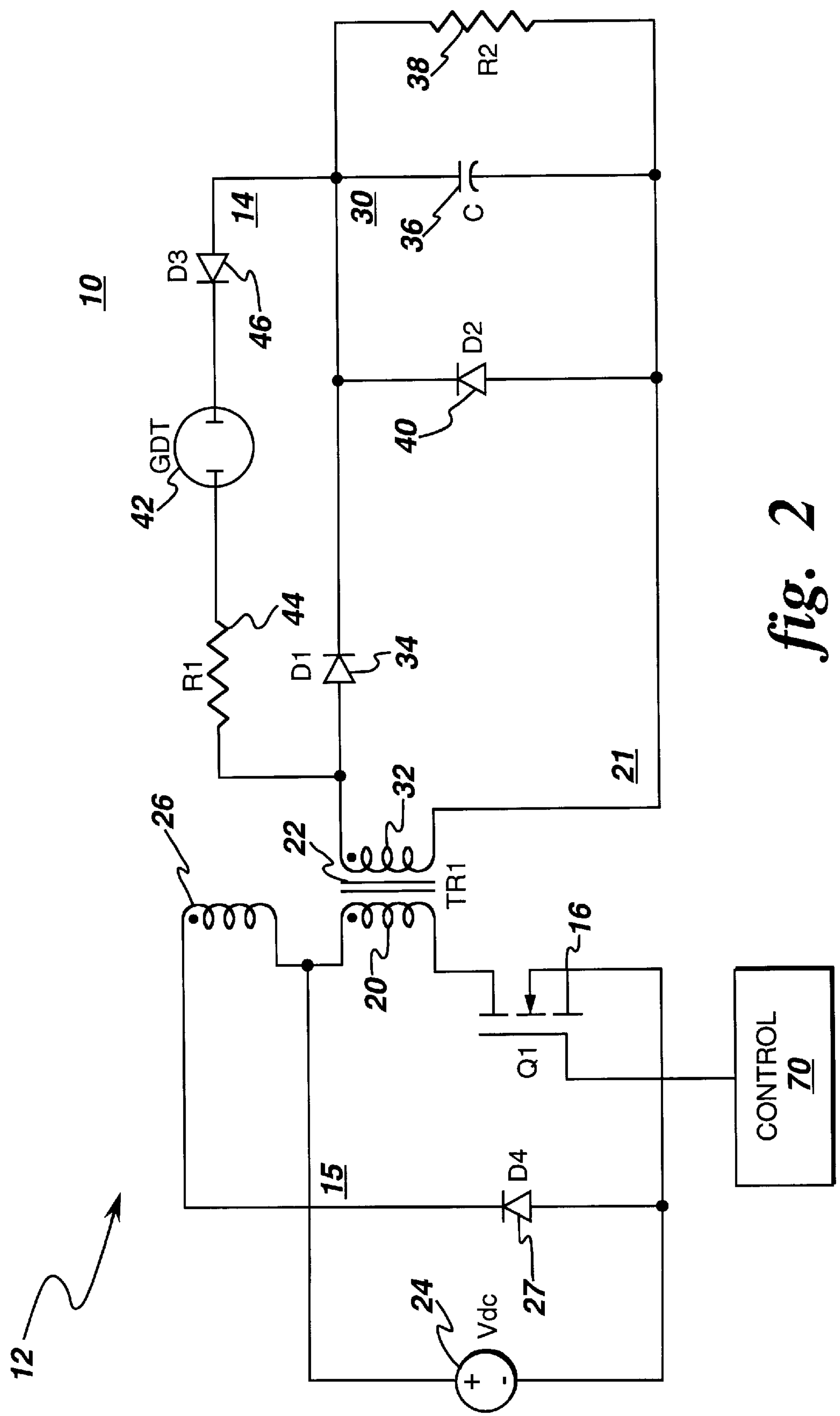
FIG. 2 schematically illustrates an alternative embodiment of the circuit of FIG. 1.
Figure 3:
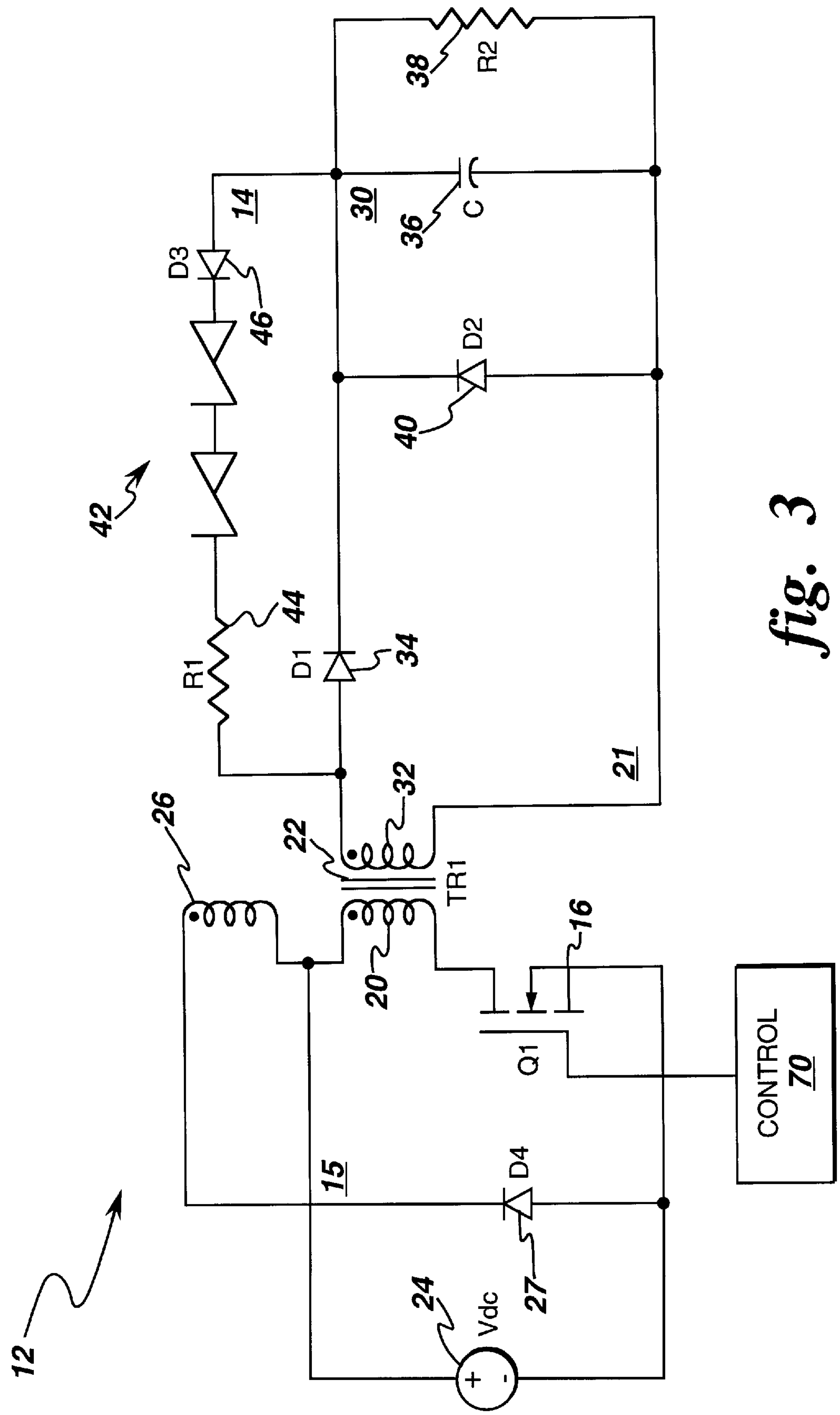
FIG. 3 schematically illustrates an alternative embodiment of the circuit of FIG. 1.

The crowbar circuit 14 is coupled between the transformer and the output capacitor. In addition, the crowbar circuit is shown as being coupled across diode 34. The crowbar circuit comprises a trigger device 42, which comprises any suitable trigger device, such as a gas discharge tube (GDT), as illustrated in FIG. 2, or a SIDAC or a series of SIDAC's, as illustrated in FIG. 3. Another alternative trigger device suitable for some applications is a krytron. The crowbar circuit is illustrated further in FIGS. 1–3 as comprising a current-limiting resistor 44 (R1) and a diode 46 (D3) connected in series with the trigger device.

In the output voltage-on (or grid-on) mode, which is also the x-ray tube current cut-off mode, switching device Q1 is successively gated on and off via a control 70. In this mode, converter 12 operates as a forward converter with power transferred from primary to secondary of transformer 22. As a first approximation, the output voltage is determined by the input voltage, the transformer turns ratio, the switching frequency, and the load current. Diode 27 (D4) connects the reset winding 26 to ground.

To rapidly turn off the grid output voltage, the crowbar circuit is activated by imposing a voltage across the crowbar circuit which is larger than the trigger device breakover voltage. With the crowbar activated, the output capacitor is shorted through a low impedance path comprising current-limiting resistor R1 and the transformer secondary winding.

The voltage across the crowbar circuit, comprising a superposition of the transformer secondary winding voltage and the output voltage, is controlled by varying the amplitude of the reverse voltage pulse across the transformer secondary winding, which is caused by resetting the core of transformer 22. The amplitude of the transformer reset pulse is proportional to the volt-seconds applied to the primary winding via control 70. During forward energy transfer (i.e., the grid-on mode), the transformer reset pulses are short with low amplitude. To turn the grid voltage off, a sufficiently long pulse is applied through device Q1 and control 70 to result in a sufficiently high reverse voltage to trigger the crowbar circuit. Furthermore, by applying a sufficiently long pulse, the transformer can be saturated such that there is little or no transformer secondary inductance in the output capacitor discharge path when the crowbar is triggered, thereby minimizing capacitor discharge time.

The output impedance of the gridding circuit, i.e., the size of the output capacitor, is limited essentially only by the time required for charging. And because the forward converter provides a direct transfer of energy, this limitation is negligible (e.g., 10–20 μsec).

Diode D2 is provided as a protection against a possible reverse charge build-up on capacitor C when the grid voltage is turned off.

The parasitic impedances of the isolation transformer are design parameters. The reverse voltage amplitude is a function of the transformer parasitic components, particularly the magnetizing inductance and the secondary winding capacitance, and the energy stored therein. Since the energy stored in the parasitic components is proportional to volt-seconds applied to the transformer, a reverse voltage of sufficient amplitude to trigger the crowbar circuit can be generated by controlling the conduction time of the converter switching device Q1, while maintaining a low voltage (i.e., less than the breakover voltage of the trigger device) during grid-on operation.

Figure 4:
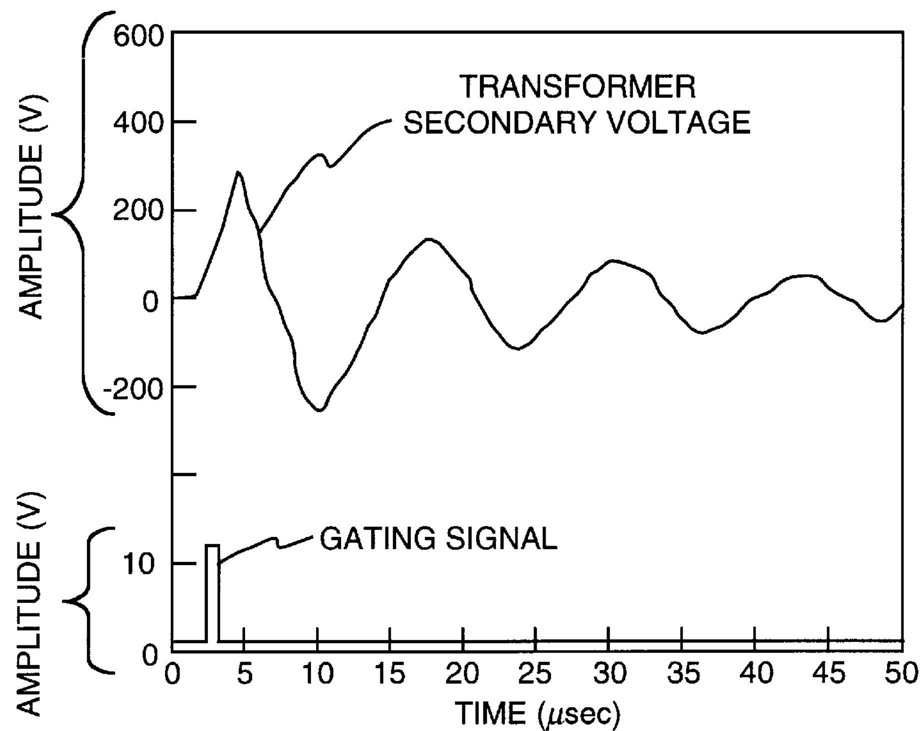
FIG. 4 graphically illustrates voltage across the transformer secondary winding with a 40 $\mu$H magnetizing inductance and a 20 nF winding capacitance as referred to the transformer primary for a 0.5 $\mu$sec conduction time for the circuit of FIG. 1.
Figure 5:
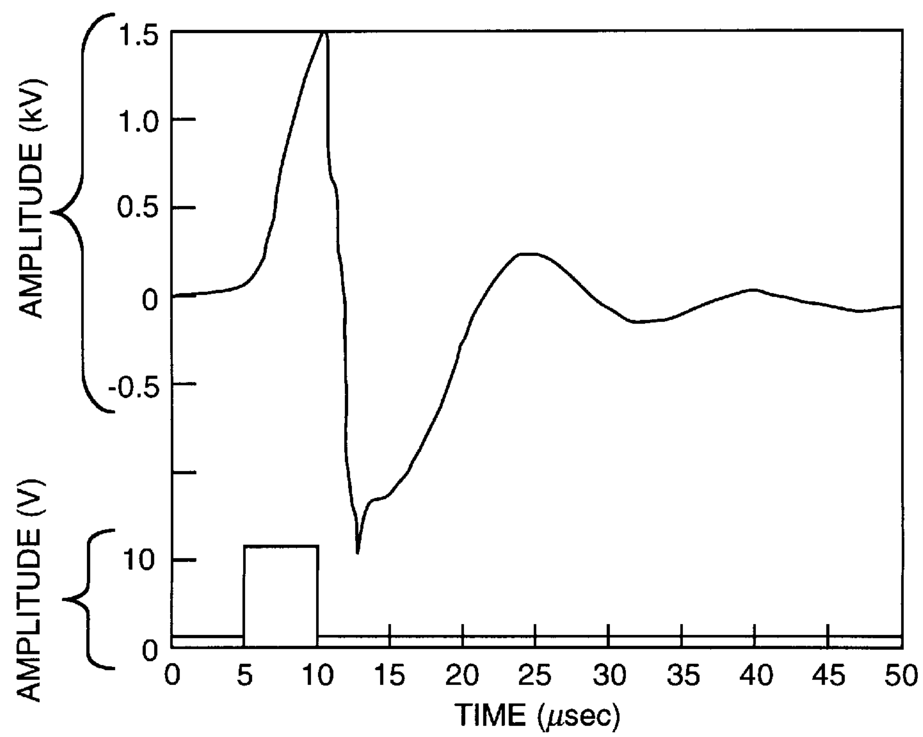
FIG. 5 graphically illustrates voltage across the transformer secondary winding with a 40 $\mu$H magnetizing inductance and a 20 nF winding capacitance as referred to the transformer primary for a 6 $\mu$sec conduction time for the circuit of FIG. 1.

FIGS. 4 and 5 illustrate voltage across secondary winding 26 for the circuit of FIG. 1 with 40 μH magnetizing inductance and 20 nF winding capacitance (both as referred to the primary) for a conduction time of 0.5 μsec and 6.0 μsec, respectively. The maximum amplitude of the reverse voltage for the 6.0 μsec pulse (FIG. 5) is nearly 20 times larger than that for the 0.5 μsec pulse (FIG. 4).

Figure 6:
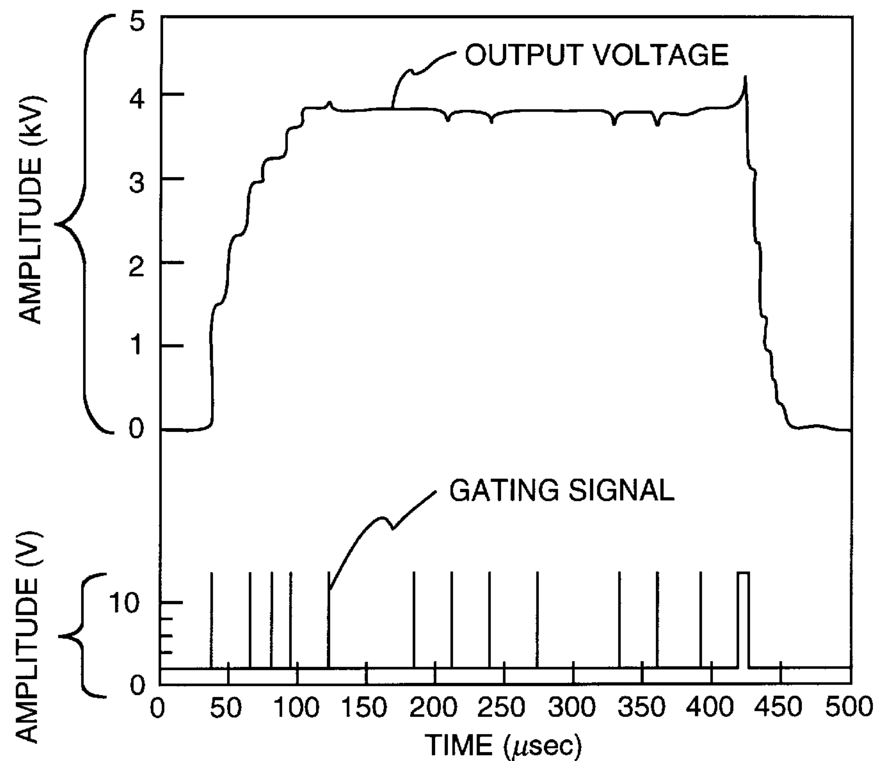
FIG. 6 graphically illustrates the output voltage produced by applying a sequence consisting of one short pulse and one long pulse for the circuit of FIG. 1.
Figure 7:
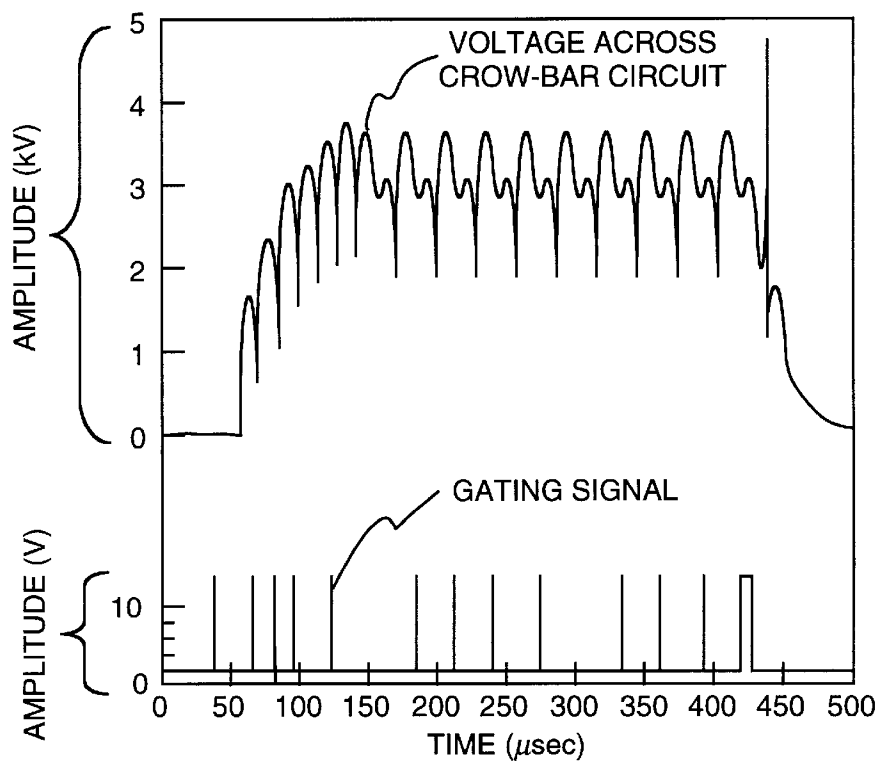
FIG. 7 graphically illustrates the voltage across the crowbar circuit during the sequence set forth with respect to FIG. 1.

For the circuit of FIG. 1, FIG. 6 illustrates the grid voltage produced by applying a sequence comprising one short and one long pulse, and FIG. 7 illustrates the corresponding voltage across the crowbar circuit for this sequence. For this example, the trigger device breakover voltage is designed to be approximately 7 kV with the voltage across the trigger device being around 6 kV during grid-on operation.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A power supply circuit, comprising:

a converter having an input converter stage comprising a switching device coupled to a primary winding of an isolation transformer, the isolation transformer comprising a secondary winding for coupling the input converter stage to an output converter stage, the output stage comprising an output capacitor and a crowbar circuit, the crowbar circuit comprising a trigger device, the crowbar circuit being connected between the transformer secondary winding and the output capacitor such that the voltage across the crowbar circuit comprises a superposition of the voltage across the output capacitor and the voltage across the secondary winding of the transformer; and a control for operating the converter as a forward converter in an output voltage-on mode and for providing a reverse voltage pulse on the transformer to activate the trigger device for operation in an output voltage-off mode such that the output capacitor discharges through the crowbar circuit, the control controlling the conduction times of the switching device such that the reverse voltage pulse has a sufficiently low amplitude for operation of the converter as a forward converter in the output voltage-on mode and such that the reverse voltage pulse has a sufficiently high amplitude to activate the crowbar circuit for operation in the output voltage-on mode.

2. The circuit of claim 1 wherein the crowbar circuit further comprises a current-limiting resistor in series with the trigger device.

3. The circuit of claim 1 wherein the crowbar circuit further comprises means for protecting the output capacitor from a reverse charge build-up during the grid-off mode.

4. The circuit of claim 3 wherein the means for protecting the output capacitor comprises a diode coupled in anti-parallel therewith.

5. The circuit of claim 1 wherein the trigger device comprises a gas discharge tube.

6. The circuit of claim 1 wherein the trigger device comprises at least one SIDAC.

7. The circuit of claim 1 wherein the isolation transformer further comprises a core reset winding coupled through a core reset device to ground such that the transformer core is reset after each input voltage pulse.

8. The circuit of claim 1 wherein the parasitic inductance and capacitance of the isolation transformer comprise predetermined design parameters.

* * * * *